United States Patent
Dickens et al.

(10) Patent No.: US 8,542,991 B2
(45) Date of Patent: *Sep. 24, 2013

(54) POWER-UP OF DEVICE VIA OPTICAL SERIAL INTERFACE

(75) Inventors: Louie Arthur Dickens, Tucson, AZ (US); Timothy A Johnson, Tucson, AZ (US); Craig Anthony Klein, Tucson, AZ (US); Gregg Steven Lucas, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,654

(22) Filed: Apr. 23, 2012

(65) Prior Publication Data

US 2012/0207468 A1    Aug. 16, 2012

Related U.S. Application Data

(63) Continuation of application No. 12/541,879, filed on Aug. 14, 2009, now Pat. No. 8,275,256.

(51) Int. Cl.
*H04B 10/08* (2006.01)
*H04B 17/00* (2006.01)
*H04B 10/00* (2006.01)
*H04J 14/00* (2006.01)

(52) U.S. Cl.
USPC .................. 398/25; 398/38; 398/94; 398/120

(58) Field of Classification Search
USPC ............................... 398/15, 25, 34
See application file for complete search history.

(56) References Cited

U.S. PATENT DOCUMENTS

| | | | | |
|---|---|---|---|---|
| 5,185,736 A * | 2/1993 | Tyrrell et al. | ................. | 370/358 |
| 5,404,541 A * | 4/1995 | Hirosawa et al. | ............. | 713/324 |
| 5,528,409 A * | 6/1996 | Cucci et al. | ..................... | 398/15 |
| 6,397,089 B1 * | 5/2002 | Kabe | ............................. | 455/572 |
| 6,747,565 B2 | 6/2004 | Mochizuki | | |
| 6,941,357 B2 | 9/2005 | Nguyen et al. | | |
| 7,005,966 B1 * | 2/2006 | Leman et al. | ................ | 340/10.4 |
| 7,020,785 B2 * | 3/2006 | Kim et al. | ....................... | 726/36 |
| 7,093,146 B2 | 8/2006 | Riley | | |
| 7,242,292 B2 | 7/2007 | Berezowski et al. | | |

(Continued)

FOREIGN PATENT DOCUMENTS

CN    101060457 A    10/2007
CN    201114169 Y    9/2008

*Primary Examiner* — Kenneth N Vanderpuye
*Assistant Examiner* — Abbas H Alagheband
(74) *Attorney, Agent, or Firm* — John H. Holcombe

(57) ABSTRACT

An optical communication serial interface is employed to power up a device from a powered down state to a powered on state. An optical receiver element receives serial optical signals transmitted by at least one optical fiber and converts the received serial optical signals to electrical signals. A low level reception converter detects and decodes the electrical signals to provide data and control words from detected and decoded normal electrical signals for a high level command processor. A power supply maintains low level power to at least the optical receiver element and the low level reception converter of the optical communication serial interface while the device is in the powered down state. The low level reception converter detects a particular abnormal sequence of electrical signals; and in response to detecting the particular abnormal sequence of electrical signals, asserts a control signal to power up the device controllable power supply.

10 Claims, 9 Drawing Sheets

(56) References Cited

U.S. PATENT DOCUMENTS

| | | |
|---|---|---|
| 7,292,157 B2 | 11/2007 | Sawada et al. |
| 7,359,643 B2 * | 4/2008 | Aronson et al. ............. 398/136 |
| 7,436,288 B2 | 10/2008 | Shin |
| 8,014,677 B2 * | 9/2011 | Golparian .................... 398/109 |
| 8,103,174 B2 * | 1/2012 | Knapp et al. ................. 398/197 |
| 2006/0031448 A1 | 2/2006 | Chu et al. |
| 2006/0053312 A1 * | 3/2006 | Jones et al. .................. 713/300 |
| 2007/0006001 A1 * | 1/2007 | Isobe et al. ................... 713/300 |
| 2008/0178017 A1 | 7/2008 | Jones et al. |
| 2008/0218398 A1 * | 9/2008 | Jeng et al. .................... 341/176 |
| 2009/0322582 A1 * | 12/2009 | Baugh et al. ................. 341/176 |

* cited by examiner

POWER-UP OF DEVICE VIA OPTICAL SERIAL INTERFACE

CROSS-REFERENCE TO RELATED APPLICATION

The present application is a continuation of U.S. patent application Ser. No. 12/541,879, filed Aug. 14, 2009 now U.S. Pat. No. 8,275,256.

FIELD OF THE INVENTION

This invention relates to devices that incorporate optical communications over an optical communication serial interface, and more particularly to control the power state of the device over that optical communication serial interface.

BACKGROUND OF THE INVENTION

It is useful to be able to power up and power down devices based upon need, rather than have them powered all of the time. It is known to remotely power off a device that is functional and communicating, by sending a command that tells it to power off. The challenge comes in powering up a device that is powered off.

One can have a dedicated signal that connects directly to the power control, with associated proprietary control logic, to power on an associated device. Alternatively, the device may be in a reduced power mode with the device still able to communicate, limiting the power savings.

SUMMARY OF THE INVENTION

Methods are provided for powering up optically coupled devices, power supply systems for devices, and optical communication serial interfaces for devices.

In one embodiment, a power supply system comprises at least one power supply and an optical communication receiver.

The power supply comprises a controllable power supply capable of powering down to a powered down state and powering up to a powered on state; and a low level power supply configured to provide power without regard to the powered up and powered down states of the device power supply.

The optical communication receiver is configured to receive serial optical signals, and comprises an optical receiver element powered by the low level power supply configured to receive serial optical signals and convert the received serial optical signals to electrical signals; and a low level reception converter powered by the low level power supply configured to detect and decode the electrical signals; to provide data and control words from detected and decoded normal electrical signals to a high level command processor; to detect a particular abnormal sequence; and to, in response to detecting the particular abnormal sequence, assert a control signal to power up the device controllable power supply.

In a further embodiment, the optical receiver element operates at a default clock rate, without speed negotiation, when the controllable power supply is in the powered down state, to sample the received serial optical signals.

The operation of the optical receiver element at the default clock rate allows the high level command processor to be powered by the controllable power supply, preventing speed negotiation by the high level command processor when the controllable power supply is in the powered down state.

In another embodiment, the particular abnormal sequence of electrical signals represents at least one sequence not used by low level transmission protocol in normal communication.

In a further embodiment, the particular abnormal sequence of electrical signals comprises a sequence of binary words representing converted received serial optical signals, in which each word comprises at least one sequence of at least ten consecutive "1"s and at least one sequence of at least ten consecutive "0"s.

Another embodiment comprises an optical communication serial interface for a device, wherein the device has a controllable power supply capable of powering down to a powered down state and powering up to a powered on state. A low level power supply is configured to provide power without regard to the powered up and powered down states of the device power supply. An optical communication receiver is configured to receive serial optical signals, and comprises an optical receiver element powered by the low level power supply configured to receive the serial optical signals and convert the received serial optical signals to electrical signals. The receiver further comprises a low level reception converter powered by the low level power supply configured to detect and decode the electrical signals; to provide data and control words from detected and decoded normal electrical signals to a high level command processor; to detect a particular abnormal sequence of electrical signals; and to, in response to detecting the particular abnormal sequence of electrical signals, assert a control signal to power up the device controllable power supply.

In a further embodiment, an optically coupled device comprises an operational element configured to receive and transmit information. The power supply comprises a controllable power supply capable of powering down to a powered down state and powering up to a powered on state, and the controllable power supply powers the operational element. The power supply also comprises a low level power supply configured to provide power without regard to the powered up and powered down states of the device power supply. The device further comprises an optical communication transceiver configured to receive and transmit serial optical signals, comprising: a high level command processor configured to provide and receive data and control words, and communicate with the operational element; a low level transmission protocol converter configured to encode data and control words received from the high level command processor into sequences of transmission electrical signals; an optical transmission element to convert the transmission electrical signals to serial optical signals for transmission; an optical receiver element powered by the low level power supply configured to receive serial optical signals and convert the received serial optical signals to electrical signals; and a low level reception converter powered by the low level power supply configured to detect and decode the electrical signals; to provide data and control words from detected and decoded normal electrical signals to the high level command processor; to detect a particular abnormal sequence of electrical signals; and to, in response to detecting the particular abnormal sequence of electrical signals, assert a control signal to power up the device controllable power supply.

In another embodiment, a method employs an optical communication serial interface to power up a device from a powered down state to a powered on state, the device having a controllable power supply capable of powering down to a powered down state and powering up to a powered on state; the optical communication serial interface comprising at least an optical receiver element, a low level reception converter, and a high level command processor. In the method, the optical receiver element receives serial optical signals and converts the received serial optical signals to electrical signals. The low level reception converter detects and decodes the electrical signals to provide data and control words from detected and decoded normal electrical signals to the high level command processor. Power is maintained to at least the optical receiver element and the low level reception converter of the optical communication serial interface while the device is in the powered down state. In response to detecting a particular abnormal sequence of electrical signals, a control signal is asserted to power up the device controllable power supply.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
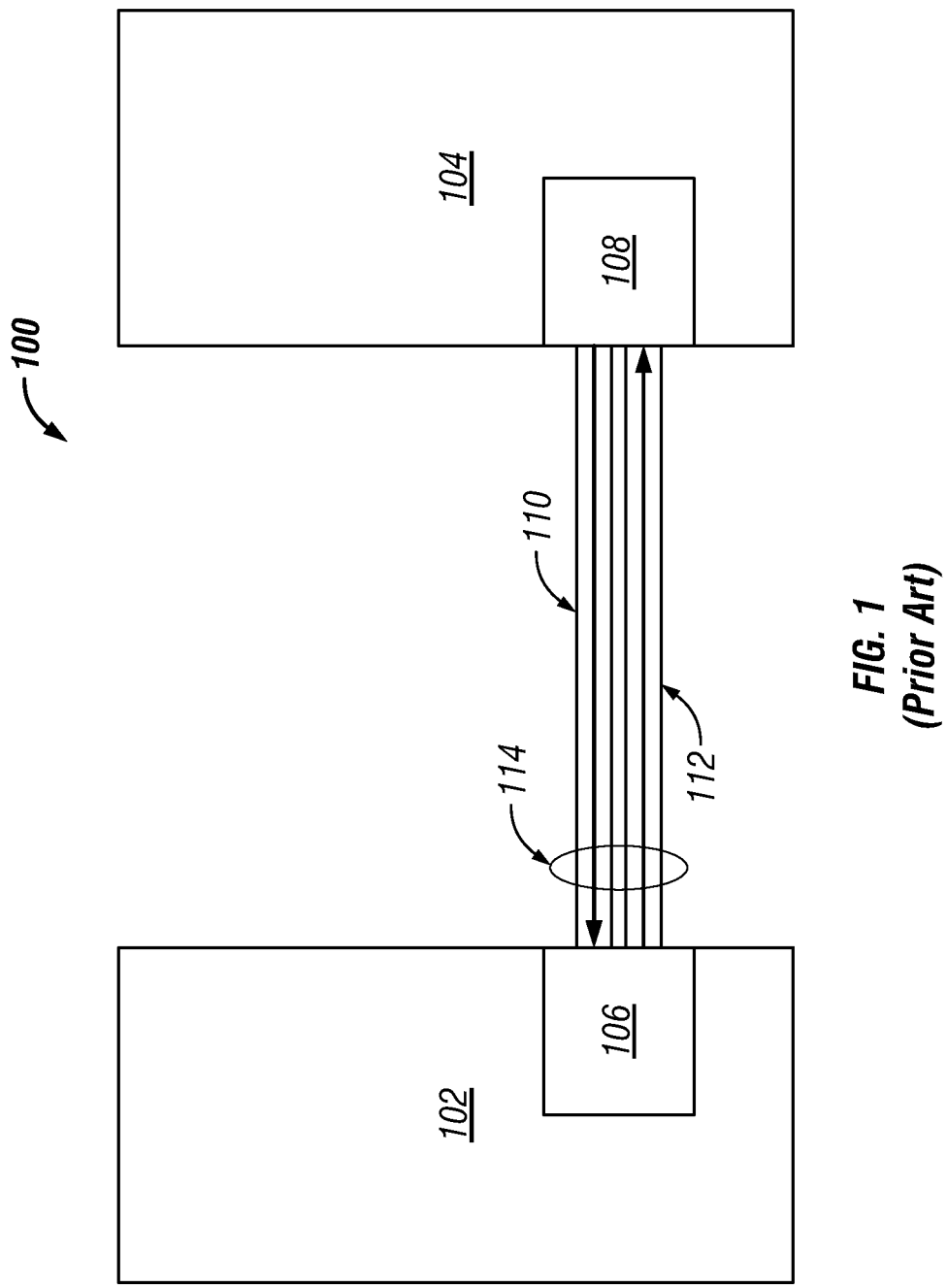
FIG. 1 is a block diagram of an exemplary prior art optical serial connection.
Figure 2:
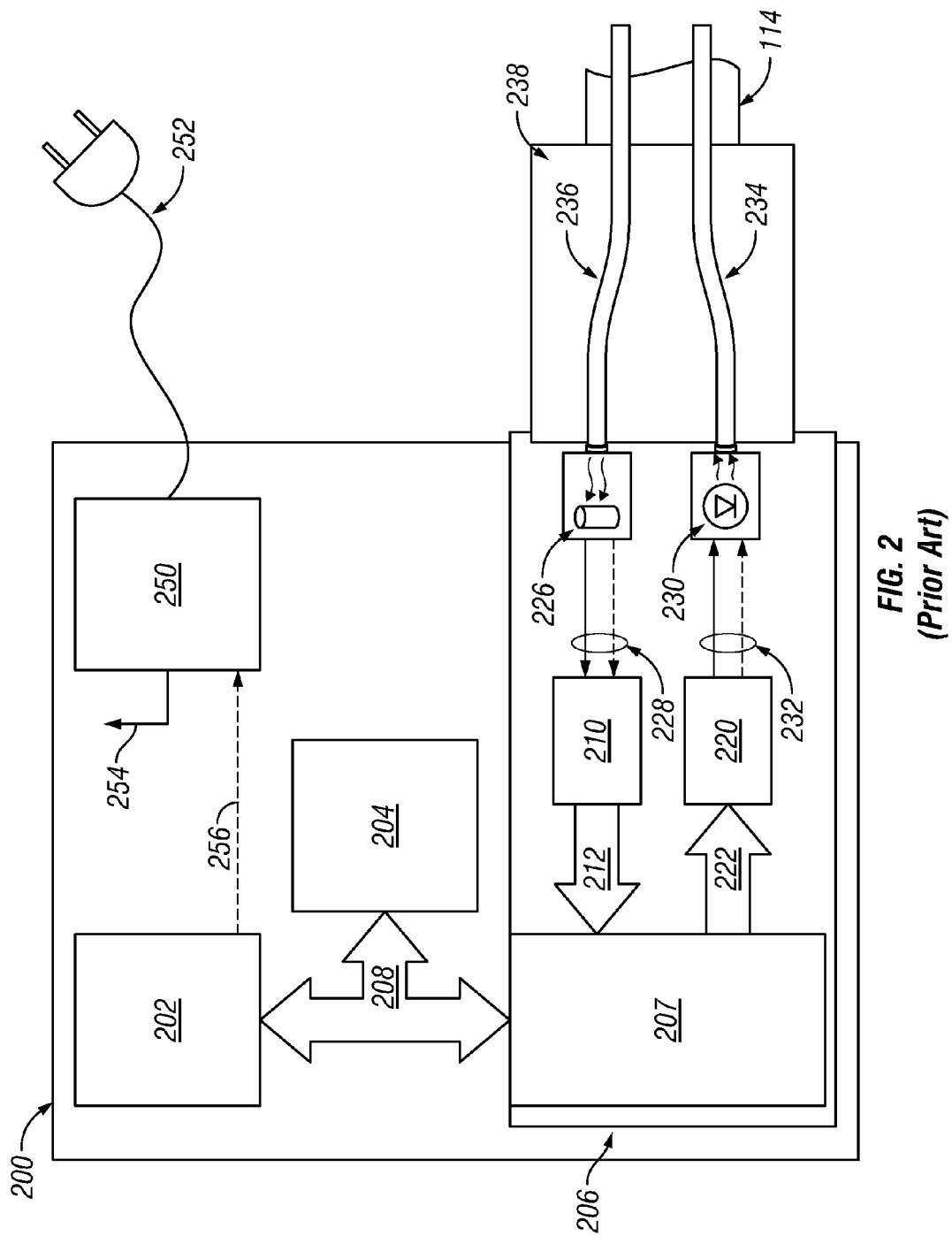
FIG. 2 is a block diagram of an exemplary prior art optically coupled device with an optical serial interface.

Referring to FIGS. 1 and 2, an example of a prior art optical serial connection 100 and optically coupled device 200 with an optical serial interface 206 are illustrated. The connecting interface protocol may be any suitable fiber channel interface and protocol, such as Fibre Channel, FCP-SCSI (Fibre Channel Protocol-Small Computer Systems Interface), DWDM (Dense Wavelength Division Multiplexing), HIPPI (High Performance Parallel Interface), Ethernet, FICON (Fiber Connectivity), ESCON (Enterprise Systems Connection), SAS (Serial Attached SCSI), Infiniband, FCoE (Fibre Channel over Ethernet), as known in the art.

Referring to FIG. 1, in one example, devices 102 and 104 communicate through a fiber channel cable 114, comprising optical fibers 110 and 112. A port 106 of device 102 transmits and receives optical signals with respect to port 108 of device 104. Port 106 of device 102 transmits an optical signal to port 108 of device 104 via fiber 112, and receives an optical signal from port 108 of device 104 via fiber 110. Port 108 of device 104 transmits an optical signal to port 106 of device 102 via fiber 110, and receives an optical signal from port 106 of device 102 via fiber 112. Commands, data, status and messages are encapsulated within, for example, Fibre Channel frames and transmitted over the connection.

In an alternative embodiment of FIG. 1, devices 102 and 104 communicate through a copper connection as known in the art. As known in the art, protocols may be independent of the physical medium. Hence, herein, the terms "optical", "optical serial interface", etc., may also refer to copper connections employing optical protocols.

Referring to FIG. 2, an exemplary prior art optically coupled device 200 comprises an operational element 202, storage element 204, optical communication port 206, and power supply 250. Device 200 may comprise device 102 or device 104 of FIG. 1. Operational element 202, storage element 204, and port 206 communicate internally via internal interface 208. Power supply 250 receives power from an external source via cable 252, and converts it to one or more DC voltages 254 to power the various elements of device 200. Operational element 202 comprises any suitable processing device and may comprise associated memory, flash, input/output ports, and support logic, as well as application specific elements. Storage element 204 comprises one or more data storage media, any of which may comprise disk drives, removable data storage, solid state storage devices, sequential storage devices, holographic and other optical devices.

Device 200 communicates with other devices through port 206. Port 206 is connected to an optical cable 114 of FIG. 1 via connector 238 and comprises optical fibers 234 and 236. Port 206 comprises a high level protocol command processor 207, low level reception and transmission protocol converters 210 and 220, and optical transducer elements 230 and 226 as known to those of skill in the art. Parallel connections 212 and 222 link command processor 207 with converters 210 and 220 respectively, and may, for example, be one 32-bit word wide, and comprise at least one control signal, allowing the differentiation between data words and control words.

High level command processor 207 sends words to be transmitted via connection 222 to low level transmission protocol converter 220, which encodes them from their native 32-bit hexadecimal value to an encoded 40-bit value, using an 8-bit/10-bit encoding scheme known in the art. The encoding scheme is designed to provide a minimal number of transitions between high and low states, and to maintain DC balance when encoded data is sent over serial interfaces. Serial encoded words are then transmitted via differential electrical signals 232 to optical transmitter element 230, which converts the electrical signals to optical signals and transmits the optical signal into fiber 234.

Optical signals from fiber 236 are received by optical receiver element 226 and converted to differential electrical signals 228 to low level reception converter 210, which receives the serial information, detects the delimiters and converts the serial information into 40-bit words, detects the data and control words, and decodes the 40-bit words to their native 32-bit hexadecimal values. The decoded words are then received by high level command processor 207 via parallel connection 212, along with indications of control words via control signals.

Command processor 207 uses two types of words to communicate over the optical interface, special words containing "K" characters, which serve to define and control the flow of information, and data words, which carry the information. For each possible eight-bit value, there are at least one and at most two corresponding ten-bit values. Similarly with special characters, there is at least one and at most two ten-bit values for each special character. When there exist two possible ten-bit values for encoding an eight-bit value, the encoding depends upon the running disparity of the information stream, so that the number of transmitted "1"s and the number of transmitted "0"s are essentially equal. This allows the transmission of the information stream through high-pass elements without the buildup of a DC voltage.

The set of valid ten-bit encoding values are chosen such that there are no more than five consecutive equal bit values of "1" or of "0". Of the possible 1024 values, only 512 are used, leaving 512 ten-bit values unused.

It is useful to be able to power up and power down devices based upon need, rather than have them powered all of the time. It is known to remotely power off a device that is functional and communicating, by sending a command that tells it to power down. The challenge comes in powering up a device that is powered down. A powered down state may comprise any situation of reduced power or power off to elements of the device, and a powered on state may comprise any situation of fully or partially operational powered on elements of the device.

Figure 3:
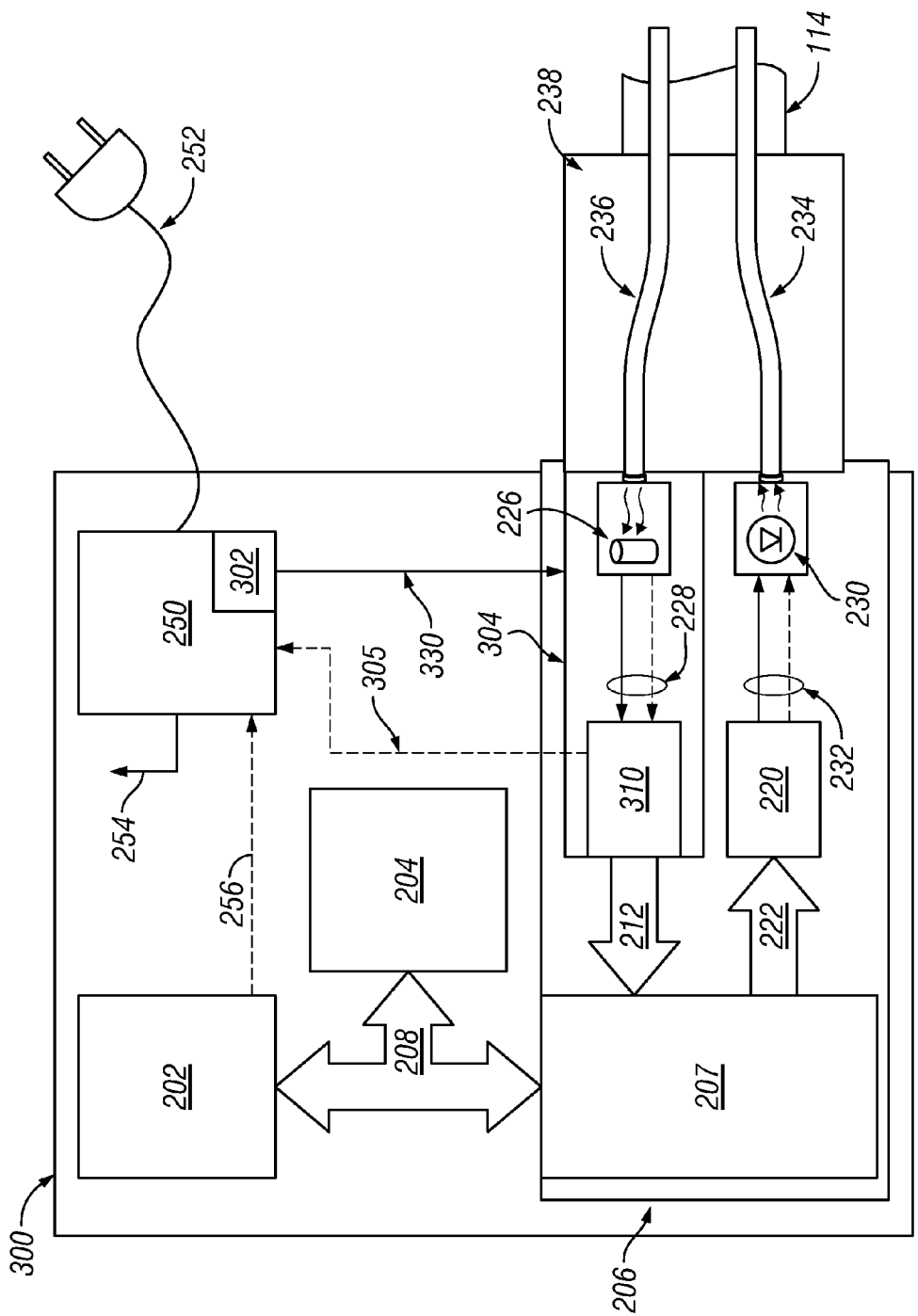
FIG. 3 is a block diagram of an exemplary optically coupled device with a power supply system in accordance with the present invention.

FIG. 3 illustrates additions to the prior art in accordance with the present invention. Device 300 is similar to the device of FIG. 2 with the addition of several elements. In one embodiment, power supply 250 additionally comprises a low level power supply 302, which may be a separate power supply or may be a low power section of power supply 250. The power supply 250 comprises a controllable power supply capable of powering down to a powered down state and powering up to a powered on state, and the controllable power supply powers the operational element 202. The low level power supply 302 is configured to provide power without regard to the powered up and powered down states of the device power supply. Thus, low level power supply 302, when enabled, remains on even when device 300 is powered down to a powered down state. Power supply 302 supplies power via power connection 330 to power boundary 304, which comprises low level reception protocol converter 310 and optical receiver 226. Other components of device 300 are powered by the power supply 250 as with respect to device 200 of FIG. 2. In certain circumstances, other elements of device 300 may also remain powered by low level power supply 302.

In one embodiment, device 300 additionally adds control signal 305 from low level reception protocol converter 310, which allows low level reception protocol converter 310 to enable and power up power supply 250 when device 300 is in the powered down state. Low level reception protocol converter 310 is functionally equivalent to that of converter 210 of FIG. 2, except that it also can detect sequences of electrical signals from optical receiver 226 that are not normally used in the low level transmission protocol used by port 206.

When a particular abnormal sequence is detected, converter 310 will assert signal 305. If the remote power on feature is enabled, the device controllable power supply 250 powers up to the powered on state, powering up device 300 to the powered on state. In one embodiment, the remote power on feature can be enabled or disabled by the operational element through control interface 256.

In one embodiment, when the device 300 is in the powered down state, the optical receiver element 226 operates at a default clock rate, without speed negotiation, to sample the received serial optical signals. The operation of the optical receiver element at the default clock rate allows the high level command processor 207 to be powered by the controllable power supply 250. Powering down the controllable power supply 250, powers off or powers down the high level command processor 207, preventing speed negotiation by the high level command processor.

In one embodiment, sequence that initiates a remote power on event is a sequence of words sampled at the default clock transmission speed by the low level converter 310.

As discussed above, valid ten-bit encoding values of the normal protocol are chosen such that there are no more than five consecutive equal bit values of "1" or of "0". Of the possible 1024 values, only 512 are used, leaving 512 ten-bit values unused. In one embodiment, the sequence comprising the particular abnormal sequence is selected from the unused ten-bit values as a sequence having more than five consecutive equal bit values of "1" and more than five consecutive equal bit values of "0".

In a preferred embodiment, the particular abnormal sequence of electrical signals comprises a sequence of binary words representing converted received serial optical signals, in which each word comprises at least one sequence of at least ten consecutive "1"s and at least one sequence of at least ten consecutive "0"s. The electrical signals will have been sampled and converted at the default clock transmission speed and the preferred embodiment represents a safety factor to insure that only the particular abnormal sequence is detected as opposed to accidentally detecting another sequence as though it were the particular abnormal sequence.

The particular abnormal sequence may comprise a sequence of 40-bit words. When a predetermined minimum number of such words are detected consecutively, the power on sequence is initiated. The transmitting device will send the word "0000000000 0000000000 1111111111 1111111111", etc., at its default clock speed. The receiver samples the serial input signal at its default clock rate. This allows the low level converter 310 to detect the remote power up signal without having to speed negotiate with the optical transceiver at the other end of the connection, so that the transmitter 230 and the low level converter 220 can be powered off. As long as the transmitter and receiver clock frequencies are within 2.5% of each other, the power-up sequence is detected.

Figure 4:
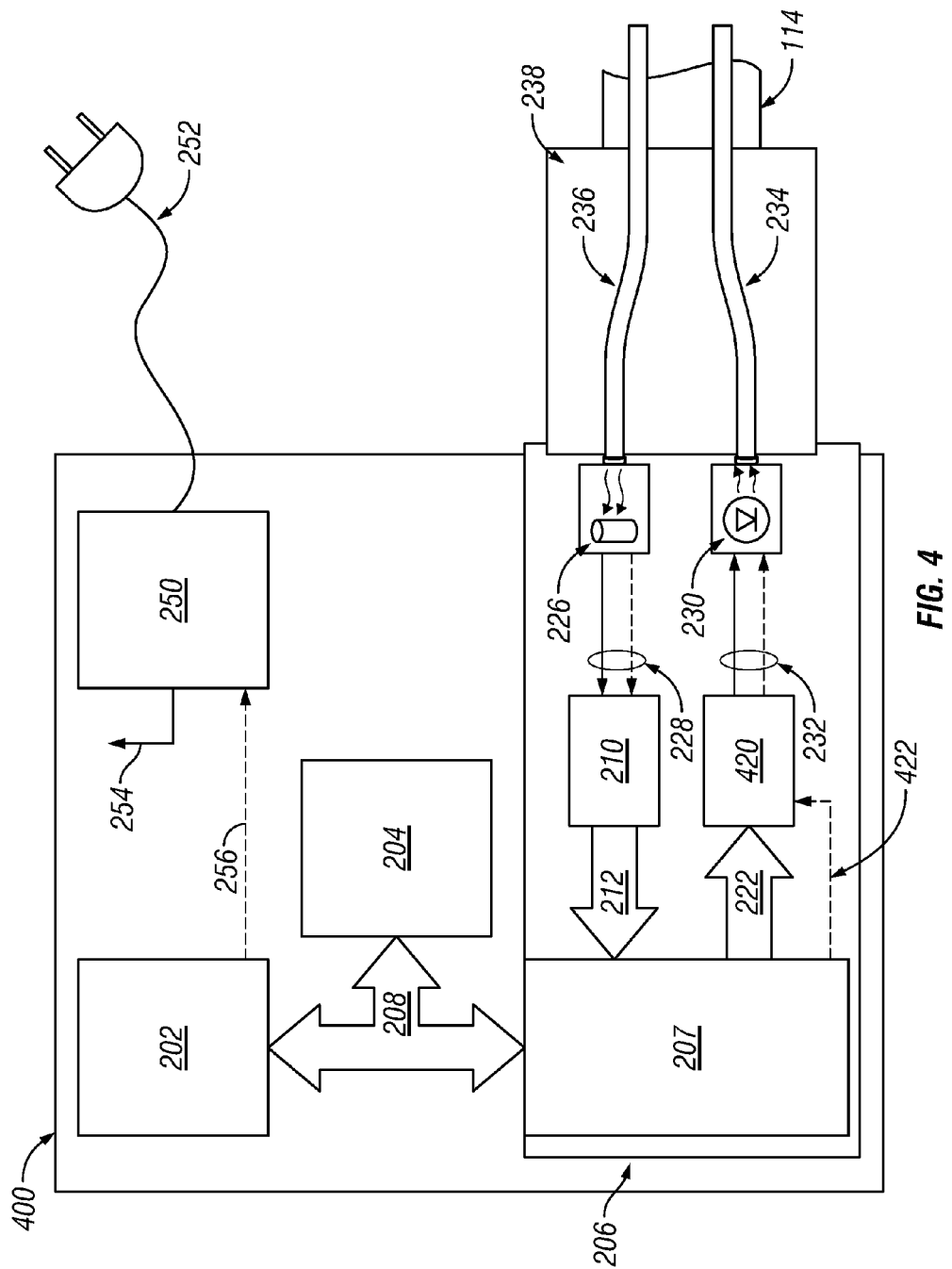
FIG. 4 is a block diagram of an exemplary optical system for generating and transmitting a remote power up signal in accordance with the present invention.

FIG. 4 illustrates an embodiment of a remote device 400 which controls the power up of the device 300 of FIG. 3. Device 400 is similar to the device of FIG. 2 with the addition of several elements. In one embodiment, low level transmission converter 220 of FIG. 2 has been replaced with low level transmission converter 420. Low level transmission converter 420 is functionally equivalent to converter 220 of FIG. 2, with the addition of a control signal 422 from high level protocol processor 207 to converter 420. During normal operation, when signal 422 is unasserted, the low level transmission converter 420 behaves as previously described with regard to converter 220, converting 32-bit words from processor 207 to 10-bit words and serializing them for transmission over differential signal 230. When control signal 422 is asserted, low level processor 420 begins transmitting the power up sequence. In one embodiment, the clock rate is set to the default value, and transmitting the particular abnormal sequence of electrical signals to the optical transmitter element 230, which converts the electrical signals to optical signals and transmits the optical signal into fiber 234. In one embodiment, the transmitting device will send a sequence of 40-bit words in which each word comprises at least one sequence of at least ten consecutive "1"s and at least one sequence of at least ten consecutive "0"s. As an example, the receiver 226 of FIG. 3 is looking for 39 bits, so that any difference in clock speeds is mitigated.

The control signal 422, for example, is controlled by the high level protocol command processor 207, and may, in turn, be controlled by the operational element 202. In an alternative embodiment, the control signal 222 emanates from and is directly driven by the operational element 202.

Figure 5:
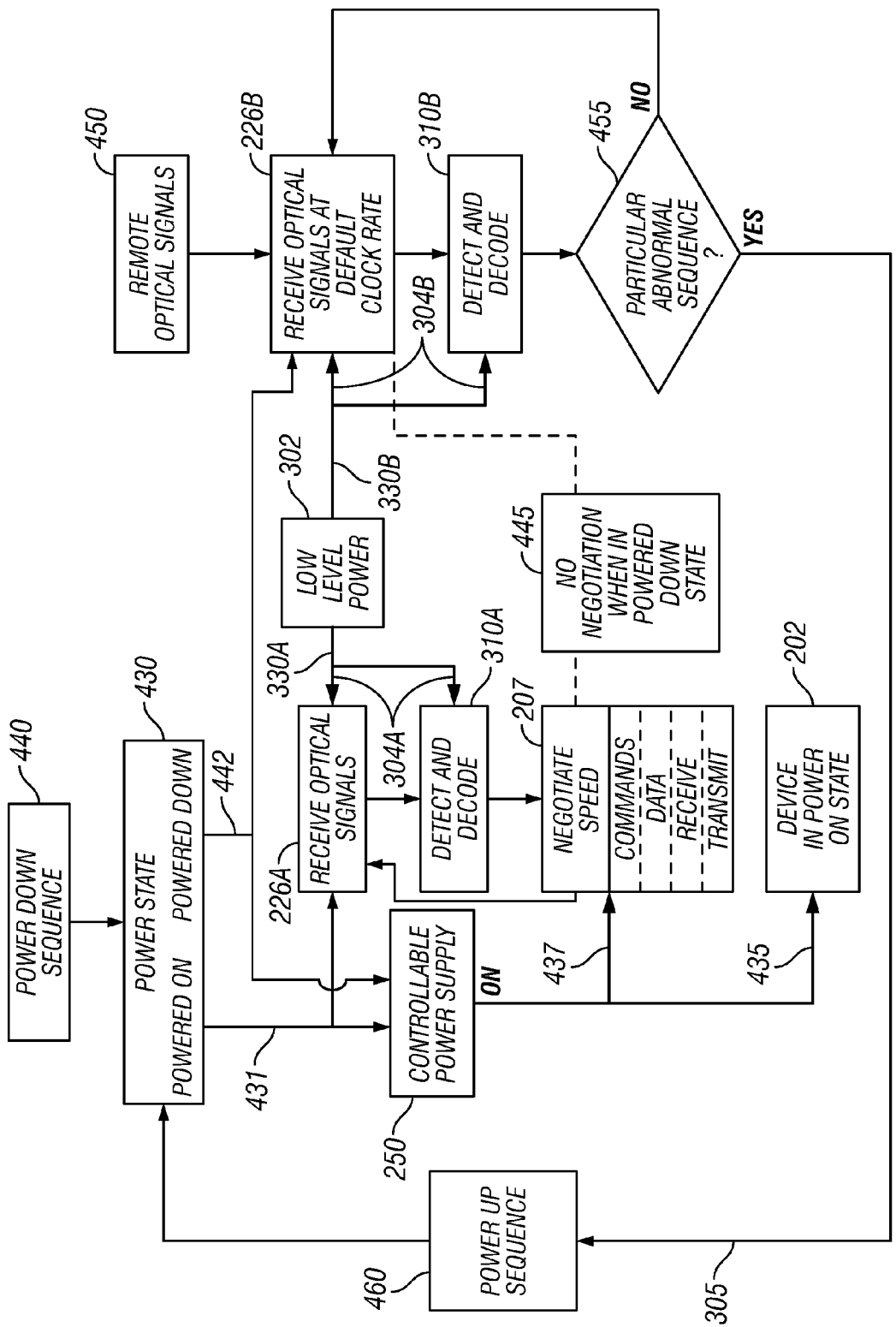
FIG. 5 is a diagrammatic chart illustrating states and operations of the power supply system of FIG. 3.

Referring to FIG. 5, states and operations of the power supply system of FIG. 3 are illustrated. The power state of device 300 is identified at power state 430. When the device is in the powered on state 431, controllable power supply 250 powers the operational element 202 and other components of device 300 as shown by power 435, and may supply power to high level protocol command processor 207, as shown by power 437. Additionally, power supply 250 comprises low level power supply 302, which, as discussed above, is configured to provide power without regard to the powered up and powered down states of the device power supply. Thus, low level power supply 302, when enabled, remains on even when device 300 is powered down to a powered down state. Power supply 302 supplies power via power connection 330, shown as 330A and 330B, to power boundary 304, shown as 304A and 304B, which comprises low level reception protocol converter 310, shown as 310A and 310B, and optical receiver 226, shown as 226A and 226B. Power connection 330, power boundary 304, low level reception protocol converter 310 and optical receiver 226 are shown twice, representing respectively the device powered on and powered down states.

When the device is in the powered on state 431, high level command processor 207 conducts speed negotiations, sends and receives data and command words, as discussed above, and receiver 226A receives optical signals at a negotiated speed, and low level reception protocol converter 310A detects and decodes the words, also as discussed above with respect to receiver 226 and low level reception protocol converter 310 of FIG. 3.

At some point, the device 300 is powered down 440 to the powered down state 442, either locally or remotely, and the controllable power supply powers down to the powered down state, for example, powering down or off the high level command processor 207, and powering down or off the transmission elements of FIG. 3. Thus, there is no speed negotiation 445 when the device is in the powered down state.

The low level power supply 302, when enabled, remains on even when the device is powered down to a powered down state 442. Power supply 302 thus supplies power to power boundary 304B, which comprises low level reception protocol converter 310B and optical receiver 226B.

In one embodiment, when the device is in the powered down state 442, the optical receiver element 226B operates at a default clock rate, without speed negotiation, to sample the received serial optical signals and provides electrical signals representing the sampled optical signals, which are detected and decoded by the reception protocol converter 310B. In one embodiment, a sequence that initiates a remote power on event 450 is a sequence comprising a particular abnormal sequence, as discussed above. In response to detecting the particular abnormal sequence of electrical signals 455, the control signal 305 is asserted to power up 460 the device controllable power supply to the powered on state 431. If the signals do not represent the particular abnormal sequence, the process cycles back to reception of optical signals at the default clock rate by the optical receiver element 226B.

Figure 6:
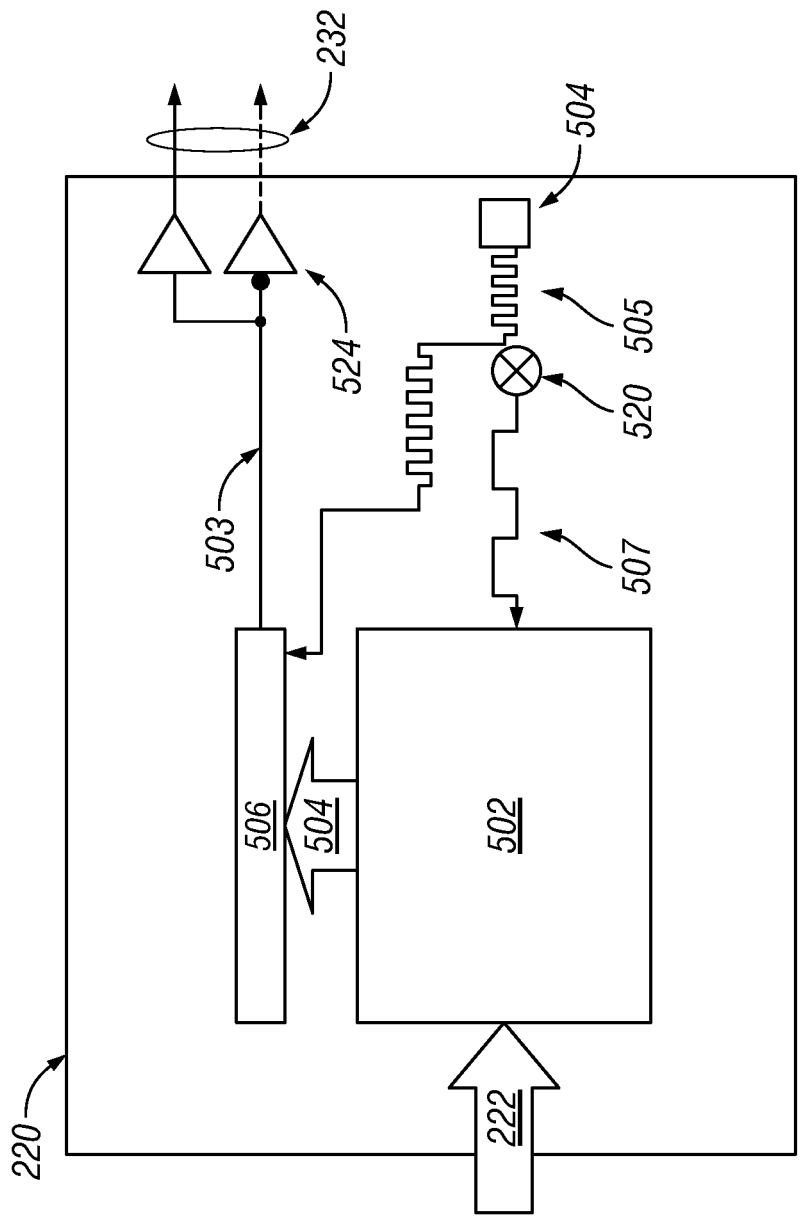
FIG. 6 is a block diagram of an exemplary prior art low level transmission protocol converter.

FIG. 6 illustrates an example of a prior art low level transmission protocol converter 220 of FIG. 2. Parallel connection 222 feeds 32-bit wide words into logic section 502, which converts the 32-bit word into an encoded 40-bit word, then copies it via parallel connection 504 into register 506 to be shifted out serially to signal 503. Signal 503 feeds differential transmitter 524, which drives the differential signals 232 out of the transmission converter. Clock synthesizer 504 generates a clock signal 505, which drives clock divider 520 and shift register 506. Clock divider 520 generates a clock signal 507 that is, for example, $\frac{1}{40}^{th}$ the frequency of clock signal 505, and is used to clock information into and out of section 502.

Figure 7:
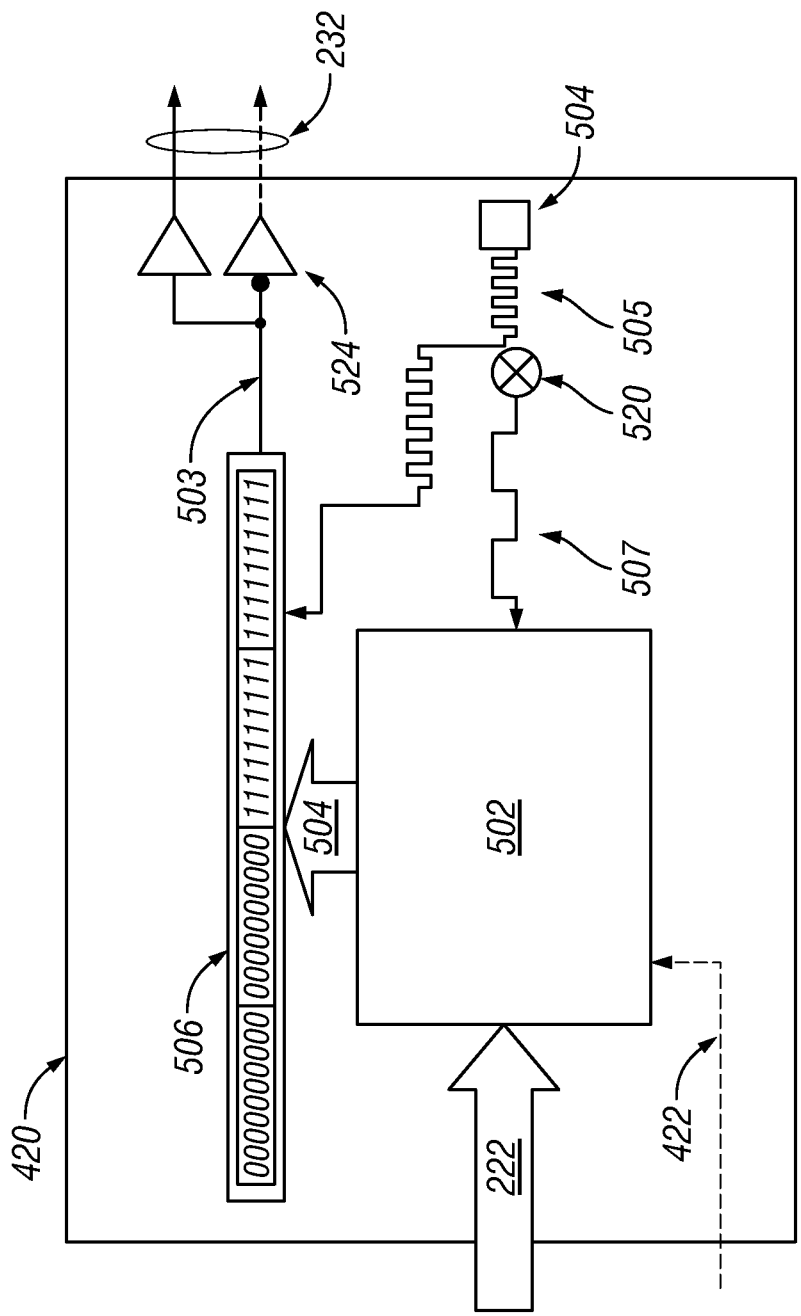
FIG. 7 is a block diagram of an exemplary low level transmission protocol converter in accordance with the present invention.

FIG. 7 illustrates an embodiment of a low level transmission converter 420 of FIG. 3 in accordance with the present invention. When control signal 422 is asserted, logic section 502 loads the 40-bit word comprising the particular abnormal sequence into register 506. Clock 504 is then used to serially clock out the sequence as a signal 503, which feeds differential signals 232. Clock 504 is set to the default value for the protocol of the serial connection.

When control signal 422 is not asserted, low level transmission converter 420 behaves as previously described in FIG. 6.

Figure 8:
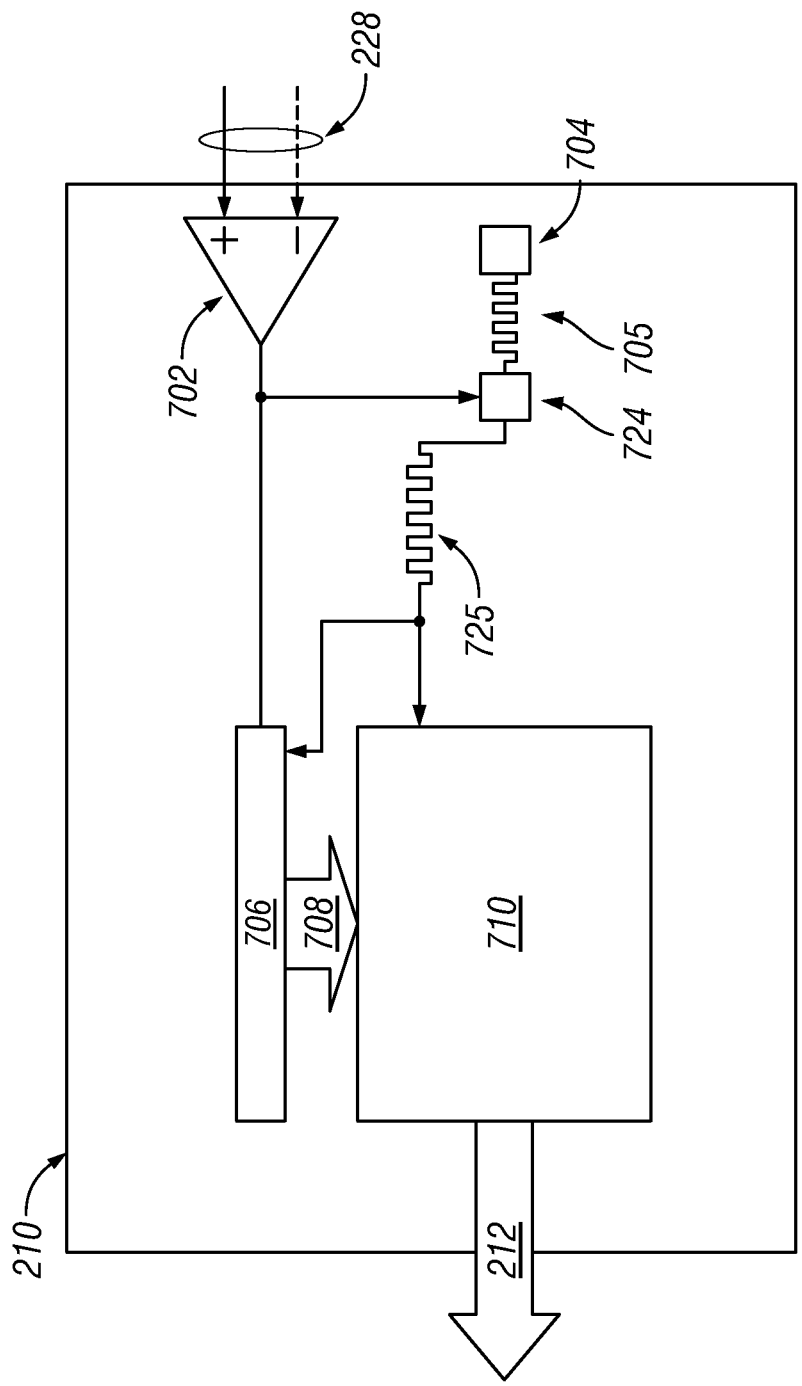
FIG. 8 is a block diagram of an exemplary prior art low level reception protocol converter.

FIG. 8 illustrates an example of a prior art low level reception converter 210 of FIG. 2. The serial input is received from differential signal 228, and is detected by differential receiver 702, which feeds shift register 706. Serial input from differential receiver 702 also feeds phase locked loop 724, which generates a clock signal 725, used to clock serial data into shift register 706 and to drive the circuitry of logic section 710. Clock 704 generates the default clock 705 for the phase locked loop 724. When no information transitions are detected by the phase locked loop 724, the output clock 725 defaults to the frequency of clock signal 705. The contents of register 706 are fed through parallel bus 708 to logic section 710. Logic section 710 looks for delimiter words containing "K" characters, and uses these to separate the bitstream into 40-bit words on the correct boundaries. The 40-bit words are then decoded to the original 32-bit words and sent out on parallel bus 212.

Figure 9:
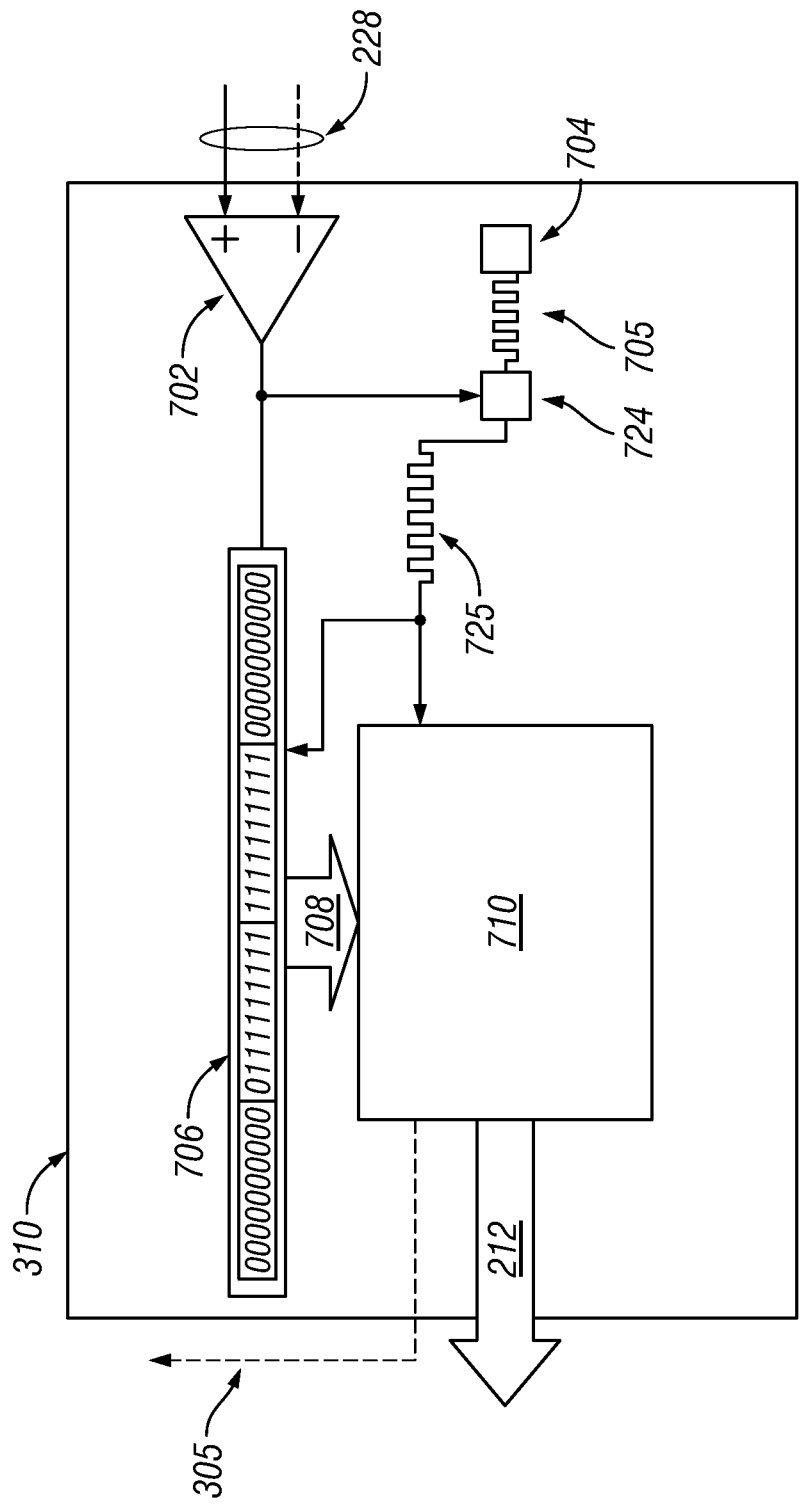
FIG. 9 is a block diagram of an exemplary low level reception protocol converter of FIG. 3.

FIG. 9 illustrates an embodiment of a low level reception converter in accordance with the present invention. During the normal power on state, reception converter 310 behaves like low level protocol converter 210 in FIG. 8. The difference between converter 210 and converter 310 comprises output signal 305. Register 706 is arranged into four sections of 10 bits each. Logic section 710 has detection circuitry that looks for any of the sections to have all "0"s or all "1"s. If at least one of the sections of register 706 contains all "1"s and at least one of the other sections contains all "0"s, then the criteria are satisfied for a power up sequence word. If a predetermined minimum number of consecutive power up sequence words are detected, the particular abnormal sequence is detected and signal 305 is asserted.

The use of the power up sequence words of the particular abnormal sequence should never occur in the normal operation of a working interface, simplifying the detection, and allowing the remote power up to be communicated without speed negotiation to synchronize two transceivers.

The implementations may involve software, firmware, micro-code, hardware and/or any combination thereof. The implementation may take the form of code or logic implemented in a medium, such as processors and/or circuitry 202, 207, 220, 310, 420, and/or storage 204, where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for employing an optical communication serial interface to power up a device from a powered down state to a powered on state, said device having a controllable power supply capable of powering down to a powered down state and powering up to a powered on state; said optical communication serial interface comprising at least an optical receiver element, a low level reception converter, and a high level command processor; said method comprising the steps of:

said optical receiver element receiving serial optical signals and converting said received serial optical signals to electrical signals;

said low level reception converter detecting and decoding said electrical signals to provide data and control words from detected and decoded normal said electrical signals;

said high level command processor receiving data and control words from said low level reception converter;

maintaining low level power to at least said optical receiver element and said low level reception converter of said optical communication serial interface while said device is in said powered down state;

detecting a particular abnormal sequence of said electrical signals; and in response to detecting said particular abnormal sequence of said electrical signals, asserting a control signal to power up said device controllable power supply.

2. The method of claim 1, additionally comprising the step of operating said optical receiver element at a default clock rate during said low level power maintaining step, without speed negotiation, when said controllable power supply is in said powered down state, to sample said received serial optical signals.

3. The method of claim 2, wherein said step of operating said optical receiver element at said default clock rate allows said high level command processor to be powered by said controllable power supply, preventing speed negotiation by said high level command processor when said controllable power supply is in said powered down state.

4. The method of claim 1, wherein said particular abnormal sequence of electrical signals represents at least one sequence not used by low level transmission protocol in normal communication.

5. The method of claim 4, wherein said particular abnormal sequence of electrical signals comprises a sequence of binary words representing converted received serial optical signals, in which each word comprises at least one sequence of at least ten consecutive "1"s and at least one sequence of at least ten consecutive "0"s.

6. A method for employing an optical communication serial interface to power up a device from a powered down state to a powered on state, said device having a controllable power supply capable of powering down to a powered down state and powering up to a powered on state; said optical communication serial interface comprising at least a high level command processor, a low level transmission protocol converter, an optical transmission element, an optical receiver element, and a low level reception converter; said method comprising the steps of:

said high level command processor providing and receiving data and control words when said device is in said powered on state;

said low level transmission protocol converter encoding data and control words received from said high level command processor into sequences of transmission electrical signals when said device is in said powered on state;

said optical transmission element converting said transmission electrical signals to serial optical signals for transmission when said device is in said powered on state;

said optical receiver element receiving serial optical signals and converting said received serial optical signals to electrical signals;

said low level reception converter detecting and decoding said electrical signals to provide data and control words from detected and decoded normal said electrical signals;

maintaining low level power to at least said optical receiver element and said low level reception converter of said optical communication serial interface while said device is in said powered down state;

detecting a particular abnormal sequence of said electrical signals when said device is in said powered down state; and in response to detecting said particular abnormal sequence of said electrical signals, asserting a control signal to power up said device controllable power supply.

7. The method of claim 6, additionally comprising the step of operating said optical receiver element at a default clock rate during said low level power maintaining step, without speed negotiation, when said controllable power supply is in said powered down state, to sample said received serial optical signals.

8. The method of claim 7, wherein said step of operating said optical receiver element at said default clock rate allows said high level command processor to be powered by said controllable power supply, preventing speed negotiation by said high level command processor when said controllable power supply is in said powered down state.

9. The method of claim 6, wherein said particular abnormal sequence of electrical signals represents at least one sequence not used by low level transmission protocol in normal communication.

10. The method of claim 9, wherein said particular abnormal sequence of electrical signals comprises a sequence of binary words representing converted received serial optical signals, in which each word comprises at least one sequence of at least ten consecutive "1"s and at least one sequence of at least ten consecutive "0"s.

* * * * *